May 3, 1932.  F. TRANSOM  1,857,120
PROJECTOR LAMP
Filed May 29, 1930
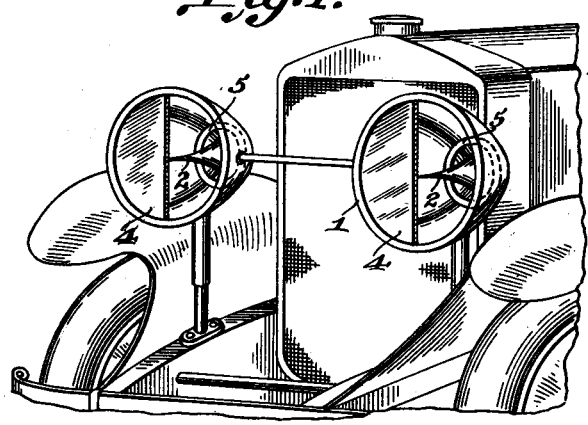
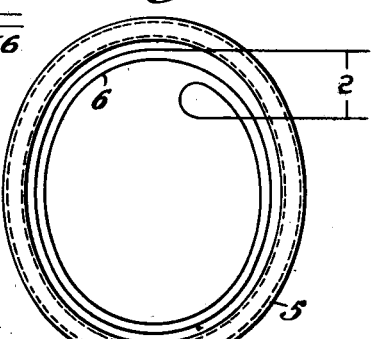
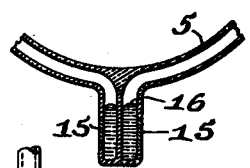
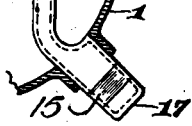
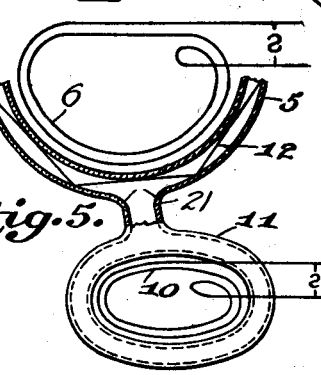
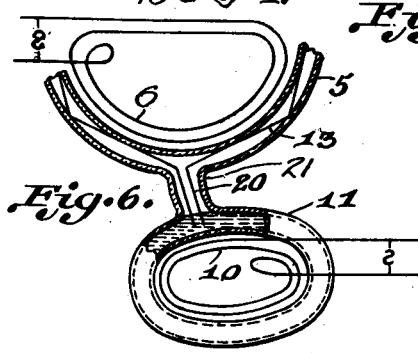
Inventor
Frederick Transom
By
Attorney Patented May 3, 1932

1,857,120

UNITED STATES PATENT OFFICE

FREDERICK TRANSOM, OF WASHINGTON, DISTRICT OF COLUMBIA

PROJECTOR LAMP

Application filed May 29, 1930. Serial No. 457,404.

My invention relates to projectors, used as a source of light. It has especial application to use as a headlight for automobiles, but embodies principles of design and operation which can have a wide application in general illumination practice, and in the fields of sanitation, and medical treatments by means of light rays.

One object of the invention is to reduce glare to a negligible degree, so that the light can be used safely and without discomfort, or harmful effects to others, as in roadway illumination.

Another object is to provide a powerful projector illuminator of compact design.

Another object is to assure the continued operation of a parabolic projector without any possibility of the source of light getting out of focus, that is, the projector is a fixed focus one.

Another object is to correctly apply a vapor tube, as a source of light energy in the operation of a parabolic projector.

Another object is to provide a vapor tube projector which can be readily started, i. e., illuminated.

Fig. 1 shows a pair of projectors embodying the invention in connection with the lighting equipment of an automobile.

Fig. 2 shows a front elevational cross-section of part of one form of light element that may be used.

Fig. 3 is a part side elevation of the light element, shown in Fig. 2, mounted in a socket in the projector.

Fig. 4 is a diagrammatic view of a different form of light element.

Figs. 5 and 6 are detail views of modifications of the form of light element shown in Fig. 4, shown diagrammatically.

Fig. 7 is a vertical cross-section of a projector, showing a light element mounted in relation to parabolic reflecting surfaces.

The projector mechanism in common use for automobile headlights generally uses an incandescent solid as a source of light. Usually this solid takes the form of a twisted wire filament, disposed approximately in the focus of a parabolic reflector. These devices have been found to be dangerous and impracticable for roadway illumination, because the intense glare set up by them blinds the drivers of approaching vehicles, causing accidents.

The glare referred to results from a number of causes, one being that the small twisted wire filament must be intensely brilliant and its countless repetition in image form by the reflecting surfaces of the parabolic reflector magnifies any variation of temperature differences of different parts of the filament, and any deviation from true focal position of these parts, the general result being unevenness of illumination and faulty projection under the laws of parabolic reflection. The solid filament emits the wrong kind of light to begin with, because the spectrum properties of an incandescent solid, when used as a source of light for a projector are very unfavorable, the light from an incandescent solid is made up of waves of many different wave lengths, or frequencies, which is a valuable characteristic if white light, like sun light, for instance, is desired, or necessary. Such a mixture of wave lengths, however, greatly complicates the problem of correct parabolic reflection, each different wave length behaving a little different to reflection and absorption media. It is a property of the parabola that a line drawn from the focus to any point of the curve, and a line drawn from this point parallel to its axis, make equal angles with a tangent to the curve at the point of incidence. Hence all the rays from a luminous point placed at the focus are reflected strictly parallel to the axis and to each other. Only a light source giving off monochromatic, or single wave length, light can fulfil this law when the source is surrounded by a glass envelope, the effect of which would be to sort out the individual wave lengths of composite light and produce a separate image by each component wave length.

As opposed to the unfavorable characteristics of white light for vehicle roadway illumination it is a characteristic of this invention to use light for this purpose of practically a single wave length, mono-chromatic light, such as given off by gases and vapors, which have what is known as a dark spectrum, in contrast to white light, the spectrum of which contains a great number of colors, each corresponding to a light wave of one particular wave length, or frequency. The reason the spectrum of a gas is almost completely dark is that there is only one wave length produced by it, which gives off light of a certain color; mercury vapor, for instance, gives off a greenish yellow light, and while such a light seems peculiar to persons accustomed only to white light, its illuminating power is even greater than that of white light, and it has other valuable features, for instance, the sensitiveness of the eye to light effects, for purposes of vision, is greatest in the wave length region of the spectrum in which green and yellow light is found.

This single wave length characteristic of the light of gases and vapors has very great significance in connection with the problem of eliminating glare as an incident to the use of powerful projectors. Among lighting experts the mercury vapor light has long been recognized for its freedom from glare in many fields of illumination, and this valuable property lends itself also to the development of a parabolic projector which functions practically glareless, provided the reflector surfaces are correctly designed and assembled in relation to the source of light.

Referring to Figs. 1 and 7 it will be understood the invention incorporates a vapor tube illuminator 5 in a projector assemblage in such a way that the tube is located substantially in the focal locus of parabolic surfaces of revolution. The tube is not only at the focal location but it is surrounded for over 180 degrees of its circumference by parabolic reflector surfaces, correctly assembled to project practically all the light given off by the tube towards the window 4 of the projector. These reflector surfaces are made up of an inner core portion 2, of convex curvature, and an outer shell portion 1 of concave curvature, the tube being permanently fixed between the shell portion and the core portion. It will also be understood that these two portions referred to above constitute in effect one continuous reflector surface, having everywhere the same parabolic relationship to the axis of the tube, because the reflector surface is generated by the revolution of a parabolic curve, of suitable equation, with respect to the tube axis, to form the desired surface, and to send all the light of the tube towards the window 4. The light rays projected form a slightly spreading beam, or cone of light, as is usual in the automobile headlight projector art, when combined with a practical source of light. At best no practical illuminator can give mathematically correct parabolic projection, but a small bore tube of smooth interior surface can come closer to it than any other light source; however, for many purposes, as in vehicle headlights, a conical beam is more useful than a true cylindrical one. The beam referred to is projected across the casing window 4 of the projector, the reflecting surfaces extending from the center of this window to the circular edge of the projector casing which holds the window in place.

Fig. 2 shows a common arrangement of the elements of an electrically excited mercury vapor tube. The material of the tube may be any one of the well known substances used in the mercury vapor art, such as ordinary flint glass, German glass, Jena glass, Bohemian glass, quartz, or any of the composite glasses found to be serviceable under high temperatures, Pyrex and other glasses, selected sometimes because of the special radiation they emit, according to the particular use contemplated for the projector. In Fig. 2 the terminal plates 15, shown also in Fig. 3, are of some metal adapted to be hermetically sealed into suitable glass, such as platinum, tungsten etc. These terminals permit of a circuit being connected to interior mercury pools 16, and of the starting and operation of the light tube, all as well known technical practice, and differing according as direct current or alternating current is used to run the illuminator, these currents being supplied in the case of an automobile by suitable generators run by its power plant.

Figs. 4, 5 and 6 illustrate novel forms of mercury vapor tube energization. In the form of excitation shown in Figs. 2 and 3 the exciting current enters the mercury pool, 16, passes from the mercury liquid to the mercury vapor in contact with it and again back to the other pool of mercury, serving as a cathode. Sometimes in the art one of these pools is dispensed with and a solid anode used, but even in the latter case a drop of approximately 14 volts takes place in the passage of current from vapor to liquid. Much research work has been done in the analysis of the losses concerned in this drop, but it appears certain that part of this energy goes to disintegrate the liquid mercury in the formation of a vapor, with the consequent thermodynamic reactions that take place in such transformations. The resistance of the vapor path has also been carefully studied and found to follow well known electrical laws. It is also well known that mercury vapor can be directly excited by the application thereto of a magnetic field generated by a high frequency oscillatory current.

In Figs. 4, 5 and 6 the mercury vapor used as a source of light is generated on a different principle compared to the usual operation described above as inherent in the Figs. 2 and 3 form of the invention. This principle will be understood by noting that Fig. 4 is shown as formed of two tubular rings, located in planes at right angles to each other, and connected by a tubular ligature, or throat 21. One of these rings 5 constitutes an illuminator element whose function is the same as ring 5 shown in Fig. 7, and this ring 5 is kept constantly supplied with mercury vapor by connection to a smaller ring 11, which has immediately adjacent thereto a coil 10, excited by alternating current. Tube 11 contains a quantity of mercury sufficient when all or partly vaporized to fill the tube 5 with vapor, but when condensed to form a closed liquid mercury, i. e., metallic path in tube 11 and act as a short circuited secondary to coil 10, thus bringing about the well known electric furnace reaction and boiling the mercury.

When tube 5, Figs. 4, 5 and 6, is filled with mercury vapor it forms a closed vapor secondary path to a coil 6, which is excited by high frequency current from a suitable source, and as long as coil 6 continues to send a magnetic field across the plane of tube 5 the latter will act as an illuminator element, or source of light. Coils 6 and 10 may both be connected to the same source of current or to different sources, and they can have different character currents, since the two magnetic fields of these coils respectively are at right angles to each other they act substantially independently of each other. Fig. 7 shows one arrangement for coil 6 with respect to tube 5 for use in a projector.

The advantage of using different character currents in coils 6 and 10 is that, notwithstanding their high efficiency, only a small part of the energy used in present day vapor lamps is usefully converted into radiation. Most of the energy goes to change the liquid metal to a vapor, i. e., supplies the latent heat of evaporation, and this is done by the same current which excites the radiation. By using a current in coil 6 best adapted to excite radiation, and one in coil 10 best adapted to boil the metal, far better results can be had, the wandering of the cathode spot is entirely suppressed, the steadiness of light radiation is increased, and less energy used.

In the form of the invention shown in Fig. 5 instead of a simple vapor path tube, as in Fig. 4, tube 5 is provided with a closed wire 12 which may be of tungsten, and whose function is to assist in giving a good starting characteristic to the tube 5, by acting to ionize it during the formation of vapor, due to the action of coil 10.

In the form of the invention shown in Fig. 6 instead of closing the wire on itself, as in Fig. 5, a wire 13 is used which has open terminals 20 that are long enough to dip into the mercury secondary contained in ring 11. Until the mercury is boiled away sufficient to expose the terminals 20 of wire 13 they will be closed exactly as in Fig. 5, but afterwards an open gap is formed. The presence of the wires 12 and 13 in Figs. 5 and 6 respectively serve to modify the character of the current in coil 6 that will serve to ignite the vapor paths in tube 5, and facilitates that operation, giving a quick starting characteristic. It will be understood that the light given off by the Fig. 5 form of the invention, and to some extent that of Fig. 6 also, will be a composite radiation made up of a mercury vapor spectrum and radiation from an incandescent solid wire of tungsten.

Whether the excitation used in the Fig. 3 form or that of Fig. 4 is employed the circular tube 5 is rigidly mounted in connection with the body of the projector as indicated in Fig. 7, with the axis of the tube corresponding substantially with the focal locus of the generator parabolic curve. Fig. 7, for instance, shows tube 5 held in place by tube 11, which is held rigidly by the projector casing. Fig. 3 shows this mounting to be effected by locking a rectangular, slightly tapering pocket member, containing the mercury terminals, into the projector shell, but other mechanical locks can be used for these parts, with the object of keeping tube 5 correctly assembled with relation to the projector.

While an incandescent wire could be disposed along the focal circle described above as a source of light, and when so used would give a much superior projector effect than if twisted into a knot as in ordinary practice I prefer to use a circular tube 5 provided with a small bore which accurately follows the locus of the foci of the compound reflecting surfaces which surround the tube.

The material of the projector body may be of any suitable metal sheet or otherwise, when the excitation of Fig. 3 is used or it may also be formed of some suitable mouldable plastic, such as porcelain, and this is especially suitable when a very high frequency current is employed for the excitation of coil 6, Fig. 4. Such currents, of course have intense heating effects when sending their fields through metallic materials, as is well known in the technic of electrical furnaces.

When the body of the projector is made of porcelain, or like material, it may be accurately turned to parabolic contour on its reflecting surface, and then finish with some suitable enamel, for instance, quartz may be sprayed thereon under the action of intense heat sufficient to melt it to the surface of the porcelain, and if great accuracy is desired the final surface may be polished to remove blemishes and flaws of curvature. Such reflecting surfaces have several advantages over metallic ones for apparently it is impossible to manufacture a metallic surface that will not dull by oxidation, crack or peel, even the chromium plated reflectors have been found to be inefficient for this service.

An important feature of this invention is found in the shielding effect produced by locating a ring illuminator well back in the body of a projector, as shown in the application of the invention to automobile headlights in Fig. 1, in which it will be seen that the perspective chosen for the view is substantially what is found in vehicles approaching each other, and that more than one half of the light ring is entirely cut off from the view of a driver going in the opposite direction.

This application is a continuation in part of my application Serial No. 339,456, filed Feb. 12, 1929, for electric vapor projector. The illuminator element disclosed in this application is claimed in a divisional application Serial No. 542,937, filed June 8, 1931, entitled—Process and apparatus for operating vapor tubes.

What is claimed as new is:

1. In a light projector, an annular reflecting surface generated by the revolution of a parabolic curve around an axis parallel to the axis of the parabola, and offset with respect thereto, in combination with a circular vapor tube source of light located substantially in the locus of the focus of the generatrix curve, whereby the entire surface of the annular reflector is illuminated by direct radiation emitted from the said source of light, and a beam of full circular cross-section is projected as reflected light by said reflecting surface.

2. In a projector lamp, a reflecting surface generated by the revolution of a parabolic generatrix curve around the axis of the projector, with the axis of the generating curve offset from the projector axis, and with the curve extending from said axis of revolution to form a full circle window aperture, in combination with a circular source of light, located substantially in the circular focal line of the reflecting surface for illuminating said surface, whereby the full area of the window aperture is illuminated by reflected light outwardly directed and substantially parallel to the axis of the projector.

3. In a light projector, an annular reflecting surface generated by the revolution of a parabolic curve around an axis parallel to the axis of the parabola, and offset with respect thereto, in combination with a circular vapor tube source of light located substantially in the locus of the focus of the generatrix curve, and energizing means for said tube comprising a high frequency magnetic field element located adjacent the tube, the said reflecting surface having a backing member of insulation material, whereby the heating effect of the varying magnetic field is avoided.

FREDERICK TRANSOM.